UNITED STATES PATENT OFFICE.

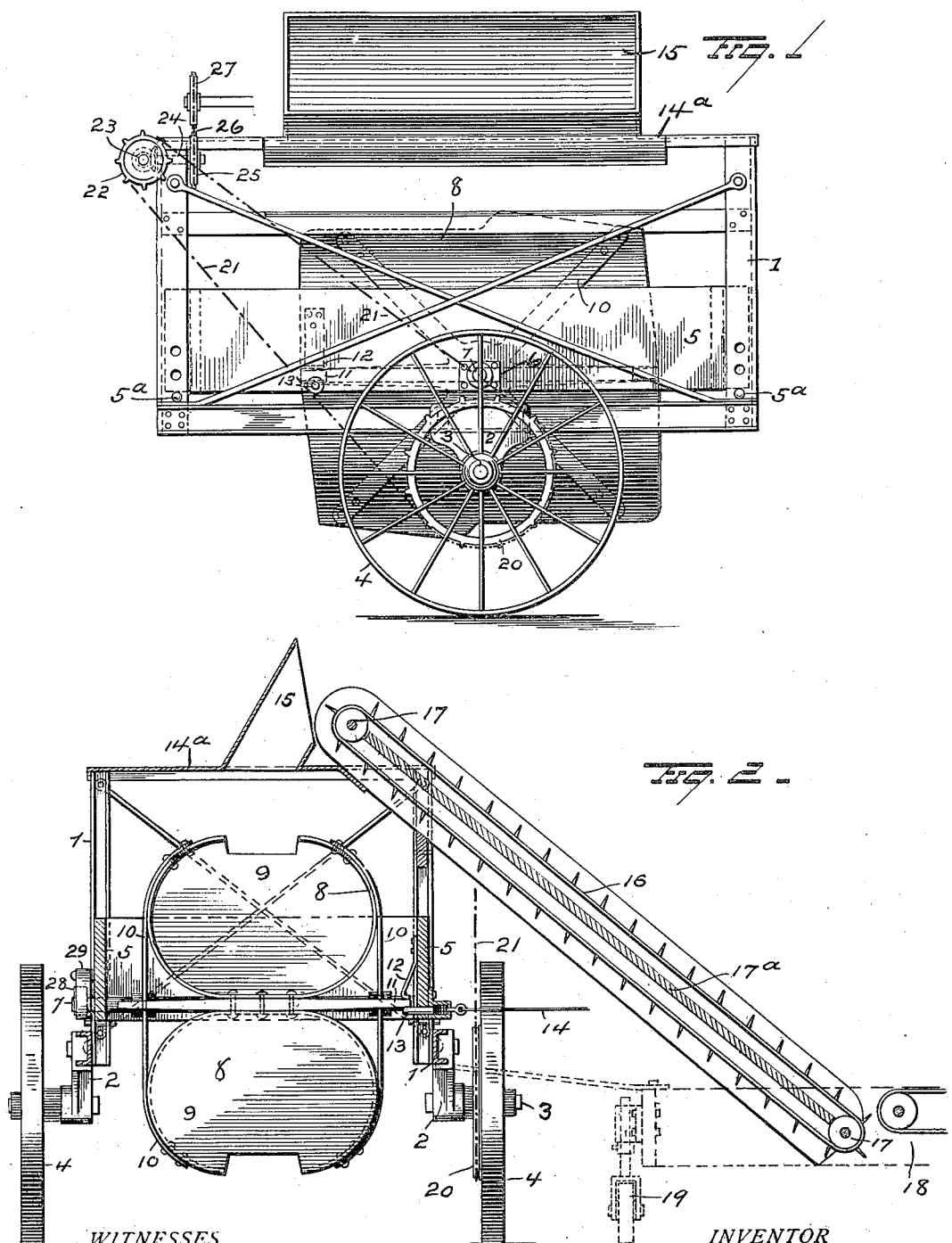

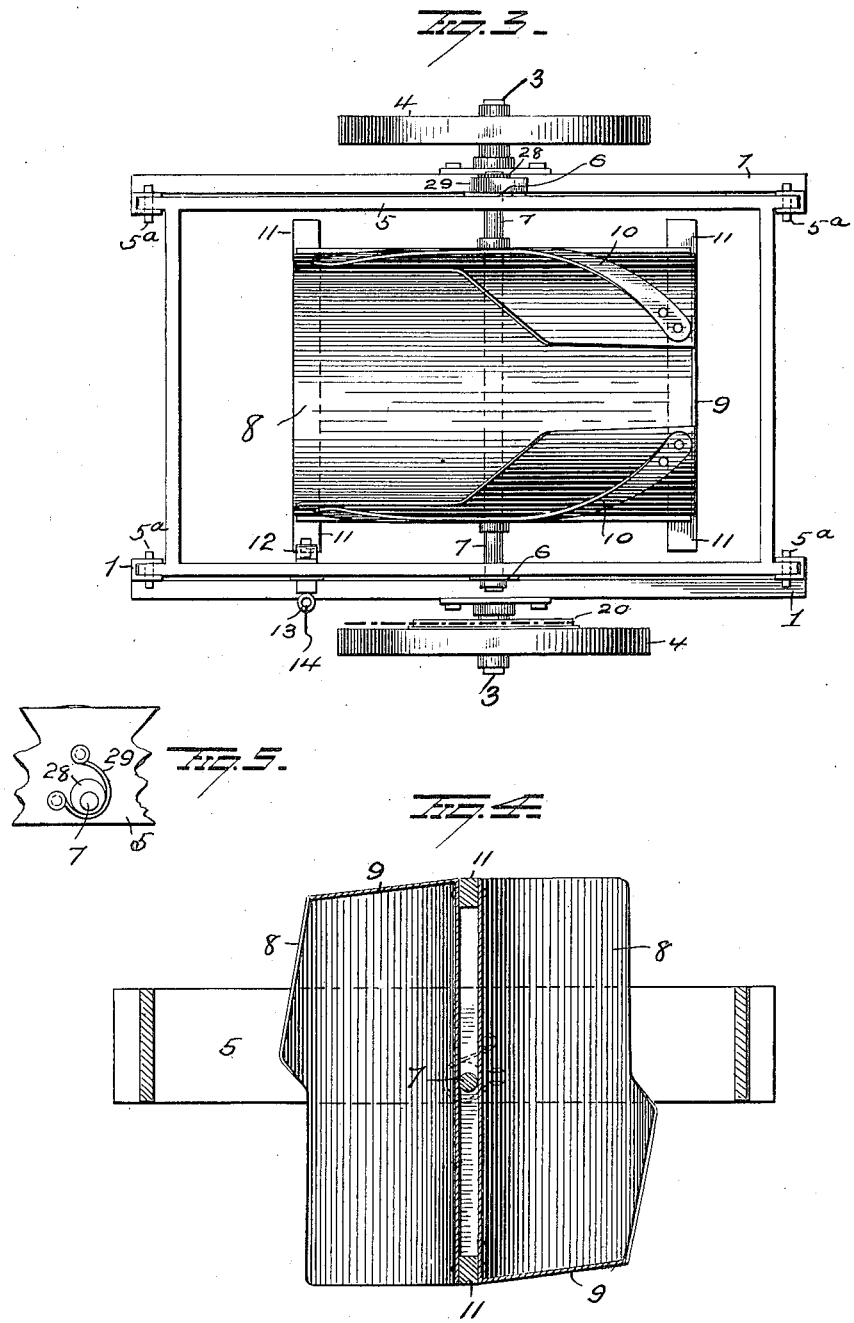

ROBERT WOODS, OF MINTO, NORTH DAKOTA.

SHOCKER.

No. 875,031.

Specification of Letters Patent.

Patented Dec. 31, 1907.

Application filed February 26, 1907. Serial No. 359,458.

*To all whom it may concern:*

Be it known that I, ROBERT WOODS, a resident of Minto, in the county of Walsh and State of North Dakota, have invented certain new and useful Improvements in Shockers; and I do hereby declare the following to be a full, clear, and exact description of the invention, such as will enable others skilled in the art to which it appertains to make and use the same.

My invention relates to an improved shocker, the object of the invention being to provide an improved device of this character which will gather the bundles or stalks from the harvester into a shock and drop or dump the shock in an upright position and move to position to receive another shock.

A further object is to provide an improved shock forming dump.

With these objects in view, the invention consists in certain novel features of construction and combinations and arrangements of parts as will be more fully hereinafter described and pointed out in the claims.

In the accompanying drawings, Figure 1 is a view in side elevation illustrating my improvements. Fig. 2 is a cross section. Fig. 3 is a top plan view of the shock forming dump. Fig. 4 is a view in section thereof, and Fig. 5 is a detail view of the automatic brake for the dump.

1 represents a rectangular open frame having depending brackets 2 to which stub axles 3 are secured and having bearings in the hubs of traction wheels 4, and support the frame midway its ends, and any suitable rods or framework (not shown) may connect the frame 1 with the harvester to compel them to move over the ground together.

A vertically movable shocker frame 5 is supported in frame 1 and guided in its movement by the corner standards of frame 1, and pins 5ª are projected into any of a series of openings in the corner standards of frame 1 to limit the downward movement of the shocker frame and hence adjust the latter according to the length of the stalks being received therein and properly position various heights of shock. The shocker frame has bearings 6 for trunnions 7 at the opposite sides of a double shock forming dump 8, permitting the latter to turn to set the shock on end and turn to a position to receive the next shock, which will more fully hereinafter appear.

The shock forming dump comprises two similar receptacles 8, secured back to back and normally resting in horizontal position to receive bundles or stalks from a harvester, to form a shock therein and the receptacles are of general cylindrical form having open tops to receive the bundles or stalks and having a closed end 9. The opening at the top adjacent to the closed end 9 is comparatively narrow, just wide enough to receive a bundle, but the opening widens out at the opposite end of the receptacle, and the sides are braced by strengthening ribs 10, which latter also serve to bind the receptacles firmly together.

Cross bars 11 are secured between the receptacles 8 and project at their ends beyond the sides of the dump, to engage a beveled spring catch 12 on shocker frame 5, when the dump is turned and moved beneath the spring catch 12 and against a locking pin 13, thus the catch 12 and pin 13 located above and below the cross bar 11, will hold the dump against turning movement while receiving the shock, and a cord 14 connected with locking pin 13 may be pulled by the operator on the harvester to dump the shock at the proper time.

A top plate 14ª is secured on frame 1 and is provided with a guide spout 15 to direct the bundles or stalks into the receptacle 8 below, and the bundles or stalks are carried to the spout 15 by an endless toothed conveyer 16, turning about rollers 17 at the ends of an inclined platform 17ª, the latter resting on frame 1 and supported at its lower end by an extension 18 of the harvester, said extension 18 having a caster wheel 19 supporting the same.

A driving sprocket wheel 20 is secured to one of the wheel hubs and connected by a sprocket chain 21 with a sprocket wheel 22 on a short shaft 23 at one corner of frame 1. This shaft 23, through the medium of suitable gearing, drives a short shaft 24 at right angles thereto, and the latter carries a sprocket wheel 25 connected by a chain 26 with a sprocket wheel 27 on the shaft of the upper roll 17 to drive the toothed conveyer and carry the bundles or stalks up to the spout 15 and into the receptacle 8 below.

When a shock has been formed in the upper receptacle 8, the operator pulls cord 14 to release locking pin 13 and the preponderance of weight at the forward end of the dump, will cause that end to move downward, and an eccentric 28 on one of the trunnions 7 will engage a brake band 29 to serve as a brake and prevent a too rapid turning of the shock forming dump. As the vehicle moves forward with the turning of the dump, the shock will be deposited on the ground; after which, the engagement of the shock by the parts of the dump receptacle near the closed end of the latter will cause said dump to turn to a horizontal position and bring the other receptacle to the top, when the bar 11 will move between catch 12 and locking pin 13 and secure the dump in position to receive another shock.

A great many slight changes might be made in the general form and arrangement of the parts described without departing from my invention, and hence, I do not restrict myself to the precise details set forth but consider myself at liberty to make such slight changes and alterations as fairly fall within the spirit and scope of my invention.

Having fully described my invention, what I claim as new and desire to secure by Letters-Patent is:—

1. In a shocker, the combination with a frame, of a dump revolubly mounted in said frame, and comprising two shock receiving receptacles secured back to back and each having an open front and one open end.

2. In a shocker, the combination with a wheeled frame, of a vertically movable frame on the wheeled frame, a shock forming dump having two shock-receiving receptacles, trunnions on the dump having rotary mounting in the vertically movable frame, an eccentric on one of said trunnions, and a band brake engaging said eccentric to retard rotary movement of the dump.

3. In a shocker, the combination with a wheeled frame, of a vertically movable frame on the wheeled frame, a shock forming dump provided with two shock-receiving receptacles and having rotary mounting in the vertically movable frame, means for holding the dump in horizontal position to receive a shock, a top plate on the frame, a spout on the top plate to guide bundles or stalks into the shock forming dump, a harvester, an inclined frame or platform connecting the top of the shocker frame with the harvester, an endless conveyer on the platform or frame to carry the bundles or stalks to the spout, and mechanism driven by one of the wheels of the shocker for driving said conveyer.

4. In a shocker, the combination with a wheeled frame, of a shock forming dump having rotary support in the frame and comprising two receptacles secured back to back, each receptacle having one closed end and an open front, said openings in the front being comparatively narrow at the closed end of the receptacle and very wide at the open end thereof, and said dump adapted to turn to dump a shock and bring the lower receptacle into position to receive a shock.

In testimony whereof, I have signed this specification in the presence of two subscribing witnesses.

ROBERT WOODS.

Witnesses:
SOPHIA E. WRIGHT.
PHIL S. RANDALL.